United States Patent [19]

Peterson

[11] Patent Number: 5,257,878
[45] Date of Patent: Nov. 2, 1993

[54] SEDIMENT MAT

[75] Inventor: Allen M. Peterson, Owego, N.Y.

[73] Assignee: New York State Electric & Gas Corporation, Binghamton, N.Y.

[21] Appl. No.: 982,339

[22] Filed: Nov. 27, 1992

[51] Int. Cl.$^5$ .............................................. E02B 3/12
[52] U.S. Cl. ......................................... 405/15; 405/19
[58] Field of Search .................. 405/15, 16, 17, 18, 405/19, 21, 32, 52, 74

[56] References Cited

U.S. PATENT DOCUMENTS

| | | | |
|---|---|---|---|
| 1,691,848 | 11/1928 | Johnson | 405/19 |
| 3,867,250 | 2/1975 | Jankowiak | 405/19 X |
| 4,181,450 | 1/1980 | Rasen et al. | 405/19 |
| 4,635,576 | 1/1987 | Bowers | 405/19 X |
| 4,854,773 | 8/1989 | Nicoll | 405/19 |

*Primary Examiner*—David H. Corbin
*Attorney, Agent, or Firm*—Salzman & Levy

[57] ABSTRACT

The present invention features a dual-purpose sediment mat for trapping loose sediments that have been disturbed upstream in a riverbed. The mat is generally rectangular in shape and laid horizontally on the riverbed. The low horizontal profile provides a mechanism by which the sediments can be entrapped without unduly disturbing the flow of the river. The sediment mat has a highly porous top surface and a tightly woven bottom surface to entrap the sediments settling thereupon. The mat itself is a loose arrangement of excelsior, straw or other sediment-absorbing material. Wooden stays define modular portions of the sediment mat, maintain its configuration and provide handles for moving the mat. Eyelets disposed at the corners and along the sides of the mat provide a mechanism for staking the mat to the riverbed. Thereafter, the sediment-rich mat can be anchored to the sides of the riverbank. There, it can be seeded to grow vegetation that beautifies and stabilizes the berm. The sediment mat can be fabricated in rolls of various sizes or shapes for ease of storage, transportation and use.

15 Claims, 2 Drawing Sheets

SEDIMENT MAT

FIELD OF THE INVENTION

The present invention pertains to devices placed on the beds of rivers and streams for pollution control, and, more particularly to sediment mats for non-invasively trapping loose sediment in a flowing body of water. The sediment-rich mat doubles as a riverbank stabilizer.

BACKGROUND OF THE INVENTION

Personnel working in rivers, streams, ponds or other bodies of water (hereinafter, for purposes of this description, referred to as rivers) often disturb the sediments of the bed. Such activities could include pipeline installation, road and bridge construction, etc. These sediments flow downstream or move offsight, causing damage to the environment.

In flowing waters, sediments are currently trapped by staking bales of hay on the riverbed downstream of the work site. After the sediments have been trapped in the bales, the bales are removed from the river or stream.

The hay bale methodology is not entirely effective, since sediments do tend to pass under and around the gaps in the individually staked bales. Also, sediment that comes to rest atop or in front of the bales is often washed away when the bales are removed from the water. Furthermore, the hay bales are not usable in streams or rivers deeper than two feet, or those having high velocity flow.

The present invention seeks to overcome the disadvantages of the hay bale method.

The invention features a number of porous mats designed to stem the dissemination of loose sediments in the flowing current. The mats are laid horizontally on the riverbed immediately downstream from the work site. Porous, the mats are designed to entrap sediment particles that come to rest on or flow through their surfaces. The porous mats comprise woven mesh filled with several inches of absorptive material such as straw or excelsior. Hardwood stays maintain the configuration and can be grasped to facilitate installation and removal. The mats have corner and side eyelets for staking them to the bottom of the river to facilitate handling and later for staking them to the river bank.

As indicated above, one application of this invention is to remove the mats after use, laying them upon the riverbanks. In this embodiment, the sediment-rich mats can be seeded to grow vegetation that beautifies and stabilizes the berm. In addition, since the mats can be completely biodegradable, they may require no subsequent disposal after staking them to the bank. Thus, the sediment mats can serve a dual purpose.

The upper, sediment-permeable surface of the mat is loosely woven to allow the sediment to pass into the mat, which then filters down into the center absorptive layer. The lower sediment-impermeable layer of the mat is tightly woven in order to ensure that the trapped sediments do not escape.

The low profile of the porous mats, vis-a-vis that of the bales of hay, has the advantage of not disturbing or changing the speed of the water flow. In other words, the mats are non-invasive with respect to the river environment. They can be used in rivers and streams of varying depth, particularly those having a depth greater than two feet. The mats can be easily stored and transported in rolls.

DISCUSSION OF RELATED ART

In U.S. Pat. No. 224,398, issued to D. M. Currie on Feb. 10, 1880, for "Permeable Dam, Dyke, etc.", a porous mattress for damming the sediments of a river is illustrated. One end of the mattress is anchored to the river bottom, while its opposite, distal end, is raised by means of a floating collar. Sediments impinging against the mattress are caused to cascade down the mattress surface and be deposited on the bottom of the riverbed. The purpose of this patented invention is to cause sediments to settle permanently on the riverbed itself, not to entrap them for subsequent removal and upland disposal.

This patented invention has the disadvantage of disturbing the flow of the river due to its vertical orientation, i.e., the course of the water is impeded, since the water, too, flows through the mattress.

In contrast, the mat of the present invention maintains a very low, flat profile that allows the water to flow over its surface without impediment. The mat of the invention allows for most of the sediment to be deposited thereupon and trapped therein for subsequent removal to upland areas.

SUMMARY OF THE INVENTION

In accordance with the present invention, there is provided a dual-purpose sediment mat for trapping loose sediments that have been disturbed in a body of water. The mat is laid horizontally on the riverbed. The low horizontal profile provides a means by which the sediments can be entrapped without unduly disturbing the flow of the river. The sediment mat has a highly porous top surface and a tightly woven bottom surface to entrap the sediments settling thereupon. The mat comprises a loose layer of absorptive material such as excelsior or straw held in place by the top and bottom layers. Rigid stays define modular portions of the sediment mat, maintain its configuration and provide handles for grasping. Eyelets disposed at the corners and along the sides of the mat provide means for handling and for staking the mat to the riverbed. Thereafter, the sediment-rich mat can be anchored to the sides of the riverbank. There, it can be seeded to grow grasses or other plants that beautify and stabilize the berm. The sediment mat can be fabricated in rolls of different sizes or shapes for ease of storage, transportation and use.

It is an object of the invention to provide an improved sediment-catching device.

It is another object of this invention to provide a non-invasive sediment mat for entrapping and removing loose sediment.

It is a further object of the invention to provide a sediment mat that has the dual purpose of stabilizing and beautifying the berm of a riverbank.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a sediment mat for pollution control of loose river sediments. The mat is laid horizontally in a riverbed downstream from a work site. Sediments that have been disturbed and suspended in the flowing stream or which travel along the stream bed, will settle upon the mat and be entrapped therein. The sediment-rich mat can then be removed from the floor of the river and placed on the riverbank to provide beautification and stabilization to the berm.

Figure 1:
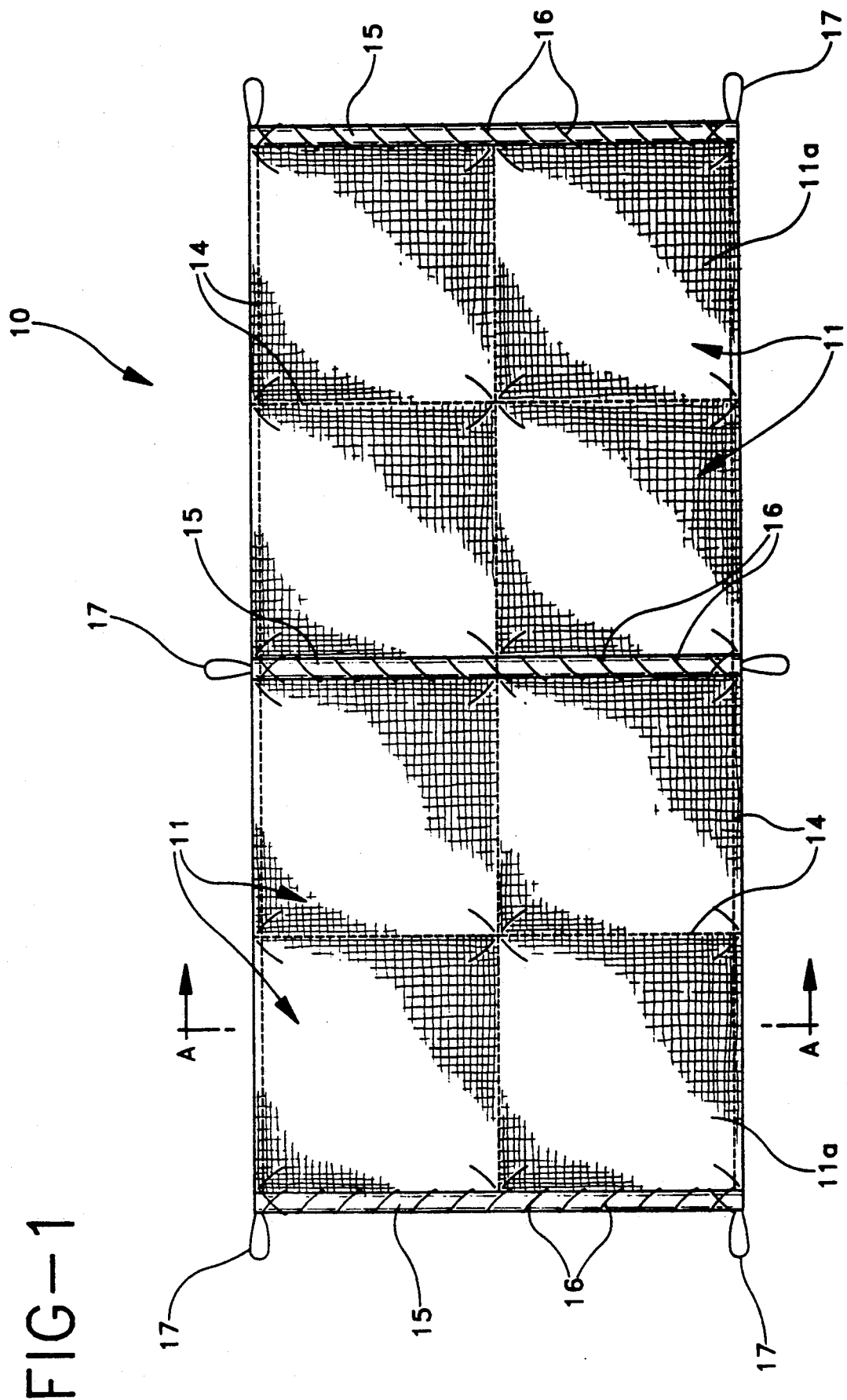
FIG. 1 illustrates a top view of the sediment mat of this invention.
Figure 2:
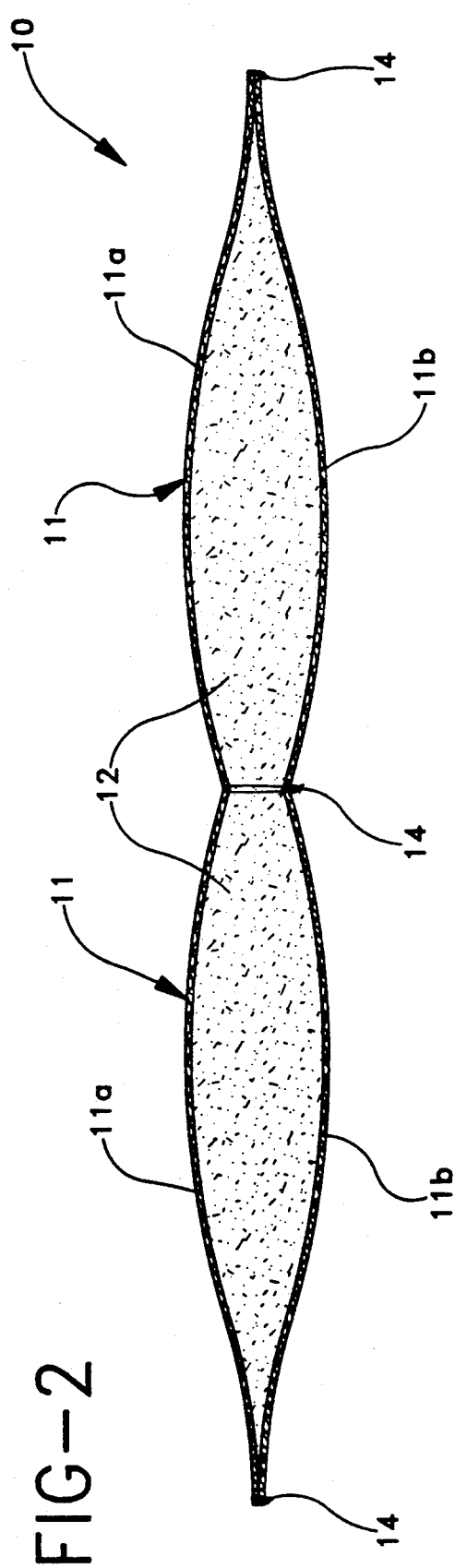
FIG. 2 depicts a sectional side view of the sediment mat of FIG. 1, taken along lines A—A.

Now referring to FIGS. 1 and 2, the sediment mat of this invention is generally shown by arrow 10. The mat 10, in the preferred embodiment, comprises ten feet by four feet of pillowed sections 11, the upper layer or surface 11a being mesh such as woven hemp, chicken wire, jute or other suitable sediment-permeable material, and the lower surface 11b being burlap, geotextile, plastic or other suitable sediment-impermeable material. Mat 10 can be manufactured in any suitable polygonal, interlocking shape and any convenient size.

The pillowed sections 11 are stuffed with a sediment-adsorbing material, such as straw or excelsior 12. The four-foot dimension is bat-stitched at its center and edges 14.

Every five feet along the ten-foot dimension of the mat, there is disposed a rigid stay 15 for strengthening and stiffening the pillowed sections 11, for maintaining the overall shape of mat 10, and for providing handles for grasping and manually lifting or moving the mat. The stays 15 are made of hardwood, metal or other suitable rigid material and are affixed to the mat 10 by suitable means such as heavy stitching 16, staples, nails, etc., not shown. The ends of the stays 15 have eyelets 17 for holding stakes (not shown) that anchor the mat 10 to the riverbed, and, thereafter, to the riverbank.

The woven mesh 11a at the top of the mat 10 is loosely woven material to allow sediments to pass through and settle in the inner absorptive layer 12. The lower surface 11b is sediment-impermeable material to prevent sediment from seeping out of the pillow sections 11.

Figure 3:
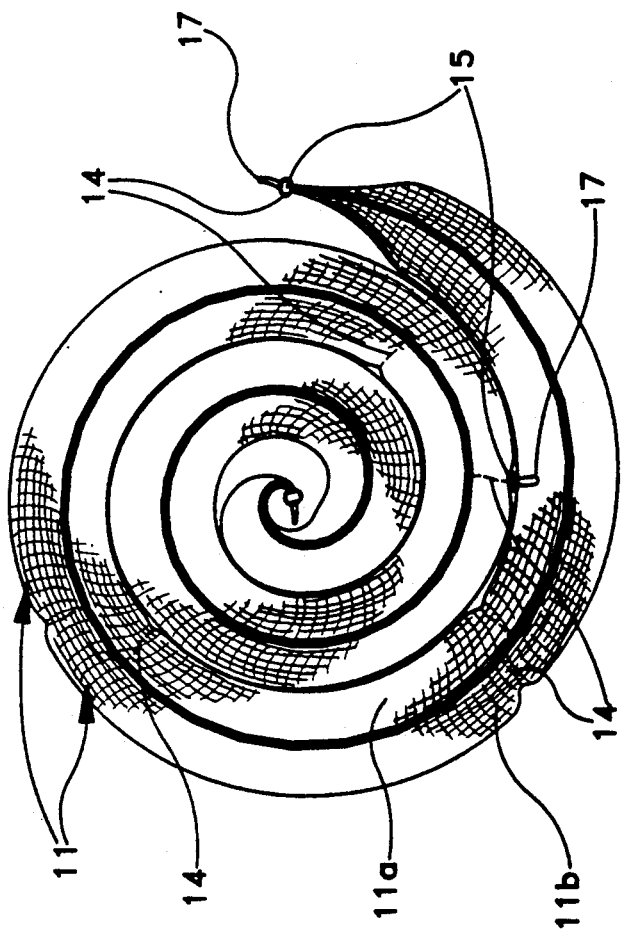
FIG. 3 depicts a sectional view of the sediment mat shown in FIG. 1, in a rolled-up configuration.

Referring to FIG. 3, a sectional view of a ten-foot length of mat 10 is shown in a rolled-up configuration for ease of handling and storage.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. For example, the preferred embodiment of the invention is constructed of biodegradable matter, but it should be understood that, under different circumstances, nonbiodegradable material can be used.

Having thus described the invention, what is desired to be protected by Letters Patent is presented in the subsequently appended claims.

What is claimed is:

1. An article of manufacture for non-invasively accumulating and removing sediment from a body of water, comprising:

a) a flexible, substantially planar mat deployable in a substantially horizontal orientation on a bed of a body of water, said flexible, substantially planar mat having a middle portion filled with absorptive material, and defined by a porous upper surface, for trapping water-borne sediment deposited thereon, and a substantially sediment-impermeable lower surface for entrapping the sediment within the middle portion of said mat;

b) rigid stays evenly spaced apart along said flexible, substantially planar mat to define modular, pillowed portions of said flexible, substantially planar mat, said modular, pillowed portions having corners and peripheral edges, said rigid stays connected to said flexible, substantially planar mat to facilitate the installation thereof to, and the removal thereof from said body of water, said removal of said flexible, substantially planar mat taking with it said trapped sediment, so that said sediment can be removed from said body of water; and c) eyelets disposed at said corners and peripheral edges of said modular, pillowed portions defined by said rigid stays, for providing means to handle and stake said flexible, substantially planar mat to said bed.

2. The article of manufacture in accordance with claim 1, wherein said absorptive material comprises straw.

3. The article of manufacture in accordance with claim 1, wherein said absorptive material comprises excelsior.

4. The article of manufacture in accordance with claim 1, wherein said absorptive material comprises batting.

5. The article of manufacture in accordance with claim 1, wherein said porous upper surface of said mat comprises a loosely woven mesh.

6. The article of manufacture in accordance with claim 5, wherein said loosely woven mesh comprises hemp.

7. The article of manufacture in accordance with claim 5, wherein said loosely woven mesh comprises jute.

8. The article of manufacture in accordance with claim 5, wherein said loosely woven mesh comprises chicken wire.

9. The article of manufacture in accordance with claim 5, wherein said loosely woven mesh comprises plastic.

10. The article of manufacture in accordance with claim 1, wherein said lower surface of said mat comprises burlap.

11. The article of manufacture in accordance with claim 1, wherein said lower surface of said mat comprises geotextile.

12. The article of manufacture in accordance with claim 1, wherein said lower surface of said mat comprises plastic.

13. The article of manufacture in accordance with claim 1, wherein said mat is flexible and can be rolled up for convenient storage, transport and use.

14. The article of manufacture in accordance with claim 1, wherein said stays have ends, the ends of said stays extending beyond the edges of said flexible, substantially planar mat and forming handles to facilitate installation and removal of said flexible, substantially planar mat.

15. The article of manufacture in accordance with claim 1, wherein said mat is flexible and can be rolled up for convenient storage and transport.

* * * * *